(12) United States Patent
Tomaru (10) Patent No.: US 8,587,796 B2
(45) Date of Patent: Nov. 19, 2013

(54) ELECTRIC DEVICE AND ELECTRIC SYSTEM

(75) Inventor: Masashi Tomaru, Tokyo (JP)

(73) Assignee: Oki Data Corporation, Tokyo (JP)

( * ) Notice: Subject to any disclaimer, the term of this patent is extended or adjusted under 35 U.S.C. 154(b) by 701 days.

(21) Appl. No.: 12/822,530

(22) Filed: Jun. 24, 2010

(65) Prior Publication Data

US 2011/0002000 A1 Jan. 6, 2011

(30) Foreign Application Priority Data

Jul. 1, 2009 (JP) .................... 2009-156672

(51) Int. Cl.
*G06K 15/00* (2006.01)
*H04N 1/60* (2006.01)
*G06F 11/00* (2006.01)

(52) U.S. Cl.
USPC ......... 358/1.14; 358/1.16; 358/1.17; 358/1.9; 358/3.23; 714/2; 714/4.1; 714/4.2; 714/22

(58) Field of Classification Search
USPC ............. 358/1.14, 1.15, 1.9, 1.13, 1.16, 1.17, 358/1.2, 1.6, 1.1, 3.23, 422, 504, 444; 714/2, 100, 4.1, 4.2, 4.4, 6.13, 6.31, 714/18, 20, 22, 25, 30, 33, 37, 38.1, 44, 48, 714/49, 57, 723, 764, 765, 411.001, 714/411.007, E11.024, E11.029; 271/288, 271/9.02, 9.03, 3.01, 3.14, 3.15, 9.05, 271/258.01, 263, 258.04
See application file for complete search history.

(56) References Cited

U.S. PATENT DOCUMENTS

2008/0240827 A1* 10/2008 Yamazaki ................... 400/73

FOREIGN PATENT DOCUMENTS

| JP | 62-135901 A | 6/1987 |
| JP | 2000-101622 A | 4/2000 |
| JP | 2005-031503 A | 2/2005 |
| JP | 2008-238563 | 10/2008 |
| JP | 2009-018489 A | 1/2009 |
| JP | 2009-122709 A | 6/2009 |

* cited by examiner

*Primary Examiner* — Ngon Nguyen
(74) *Attorney, Agent, or Firm* — Kubotera & Associates, LLC (57) ABSTRACT

An electric device is capable of transmitting and receiving data relative to an external device. The electric device includes an error detection unit for detecting an error occurred in the electric device; an error restoration command holding unit for holding an error restoration command to restore the error; and an error analyzing unit for analyzing the error occurred in the electric device and retrieving the error restoration command from the error restoration command holding unit according to an analysis result of the error. In the electric device, when the error detection unit detects the error, the error restoration command is retrieved from the error restoration command holding unit according to an analysis result analyzed with the error analyzing unit.

20 Claims, 10 Drawing Sheets

FIG. 1

| Error information table | |
|---|---|
| Error code | Error information |
| E001 | System error |
| E002 | Data error |
| ⋮ | ⋮ |
| E240 | Sheet size error |
| E241 | Sheet type error Sheet |
| E242 | thickness error |
| ⋮ | ⋮ |
| E300 | Sheet jam error |

FIG. 2

| Error restoration sequence table ||
|---|---|
| E001 | Restart printer.<br>Push restoration button. |
| E002 | Delete data.<br>Push restoration button. |

⋮

| | |
|---|---|
| E240 | Change sheet size.<br>Push restoration button. |
| E241 | Change sheet type.<br>Push restoration button. |
| E242 | Change sheet thickness.<br>Push restoration button. |

⋮

| | |
|---|---|
| E300 | Remove jammed paper. |

FIG. 3

| Error restoration command table | |
|---|---|
| Error code | Error restoration command |
| E001 | COMMAND REBOOT |
| E002 | COMMAND DATACLEAR |
| ⋮ | ⋮ |
| E240 | COMMAND PAPERSIZE |
| E241 | COMMAND PAPERTYPE |
| E242 | COMMAND PAPERWEIGHT |
| ⋮ | ⋮ |
| E300 | No command |

ELECTRIC DEVICE AND ELECTRIC SYSTEM

BACKGROUND OF THE INVENTION AND RELATED ART STATEMENT

The present invention relates to an electric device capable of operating with power supply. More specifically, the present invention relates to an electric device such as an image forming apparatus having a function of forming an image, and to an electric system including the electric device.

When an error occurs in a conventional electric device such as an image forming apparatus upon forming image data, the conventional electric device may be configured to display detailed information regarding contents of the error to an operator (refer to Patent Reference).

Patent Reference: Japanese Patent Publication No. 2008-238563

In the conventional electric device, it is possible for the operator to confirm error information of the error occurred in the conventional electric device. However, it is still necessary for the operator to conduct an error restoration operation on the conventional electric device to restore the error according to an operation sequence contained in the error information, thereby making the error restoration operation cumbersome. Especially when the error restoration operation is conducted to recover a simple error except a physical error such as a paper jam, it is still necessary to put lots of energy and time.

In view of the problems described above, an object of the present invention is to provide an electric device capable of solving the problems of the conventional electric device.

Further objects and advantages of the invention will be apparent from the following description of the invention.

SUMMARY OF THE INVENTION

In order to attain the objects described above, according to a first aspect of the present invention, an electric device is capable of transmitting and receiving data relative to an external device. The electric device includes an error detection unit for detecting an error occurred in the electric device; an error restoration command holding unit for holding an error restoration command to restore the error; and an error analyzing unit for analyzing the error occurred in the electric device and retrieving the error restoration command from the error restoration command holding unit according to an analysis result of the error.

In the electric device, when the error detection unit detects the error, the error restoration command is retrieved from the error restoration command holding unit according to an analysis result analyzed with the error analyzing unit.

According to a second aspect of the present invention, an electric system is formed of a host device and an electric device capable of operating upon receiving data from the host device. The electric device includes an error detection unit for detecting an error occurred in the electric device; an error restoration command holding unit for holding an error restoration command to restore the error; and an error analyzing unit for analyzing the error occurred in the electric device and retrieving the error restoration command from the error restoration command holding unit according to an analysis result of the error.

In the electric device, when the error detection unit detects the error, the error restoration command is retrieved from the error restoration command holding unit according to an analysis result analyzed with the error analyzing unit.

In the present invention, when a simple error occurs, the electric device is capable of executing the error restoration command for dealing with and restoring the error. Accordingly, it is possible to reduce a burden on an operator for restoring the error.

BRIEF DESCRIPTION OF THE DRAWINGS

FIGS. 6(a) and 6(b) are schematic views showing display examples of a display unit according to the first embodiment of the present invention, wherein

DETAILED DESCRIPTION OF PREFERRED EMBODIMENTS

Figure 1:
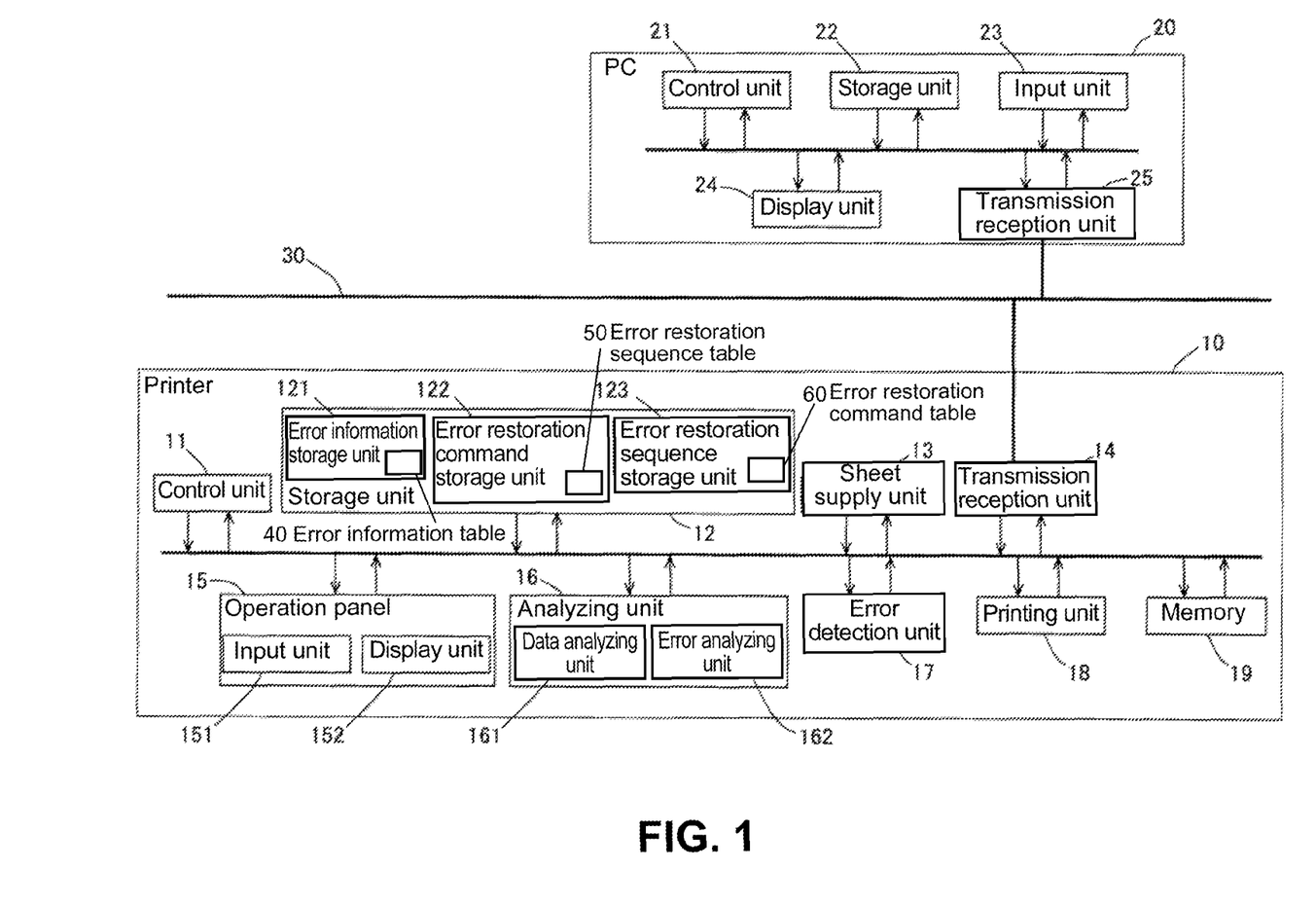
FIG. 1 is a schematic view showing a block diagram showing a configuration of an electric system according to a first embodiment of the present invention.

Hereunder, embodiments of the present invention will be explained with reference to the accompanying drawings.
First Embodiment A first embodiment of the present invention will be explained. FIG. 1 is a schematic view showing a block diagram showing a configuration of an electric system according to the first embodiment of the present invention.

As shown in FIG. 1, the electric system includes a printer 10 as an image forming apparatus or an electric device; a PC 20 (Personal Computer) as a host device of the printer 10; and a network bus 30 for connecting the printer 10 and the PC 20.

In the embodiment, the printer 10 includes a control unit 11; a storage unit 12; a sheet supply unit 13; a transmission reception unit 14; an operation panel 15; an analyzing unit 16;

an error detection unit 17; a printing unit 18; and a memory 19. These components are connected with each other through a bus.

In the embodiment, the control unit 11 controls an operation of each component of the printer 10. The storage unit 12 is a block for storing information, and includes an error information storage unit 121 for storing error information, an error restoration sequence storage unit 122 for storing an error restoration sequence, and an error restoration command storage unit 123 for storing an error restoration command. The sheet supply unit 13 is provided for supplying a medium to be printed. The transmission reception unit 14 receives data from outside, and transmits data from the printer 10.

In the embodiment, the operation panel 15 is an operation panel, and includes an input unit 151 formed of a touch panel and a keyboard for an operator to operate and input an instruction or information, and a display unit 152 formed of a display device such as a display panel. The error detection unit 17 is provided for detecting an error and a type thereof occurred in the printer 10. The analyzing unit 16 includes a data analyzing unit 161 for analyzing image data received with the transmission reception unit 14 and an error analyzing unit 162 for analyzing the error detected with the error detection unit 17.

In the embodiment, an error includes a simple error such as a communication error between components in the printer 10, in which it is possible to restore through prompting re-establishment of communication, and a non-restorable error such as an error, in which a print medium is jammed in a transportation path. When the non-restorable error occurs, it is not possible to automatically restore the error, and it is necessary for the operator to perform a manual operation such as removing the print medium.

In the embodiment, the printing unit 18 is provided for printing the image data analyzed with the data analyzing unit 161 on a sheet. The memory 19 is provided for temporarily storing information necessary for controlling with the control unit 11 and the image data to be printed with the printing unit 18.

In the embodiment, the PC 20 includes a control unit 21, a storage unit 22, an input unit 23, a display unit 24, and a transmission reception unit 25, and these components are connected with each other through a bus. The control unit 21 controls an operation of each component of the PC 20. The storage unit 22 is provided for storing information necessary for an operation of the PC 20. The input unit 23 includes a keyboard and a mouse for an operator to operate and input an instruction and information. The display unit 24 includes a display for displaying various types of information. The transmission reception unit 25 is provided for receiving data from an outside, and transmitting data from the PC 20.

In the embodiment, the error detection unit 17 and the error analyzing unit 162 correspond to an error detection unit and an error analyzing unit, respectively. Further, the error analyzing unit 162 corresponds to an error restoration command execution unit.

Figure 2:
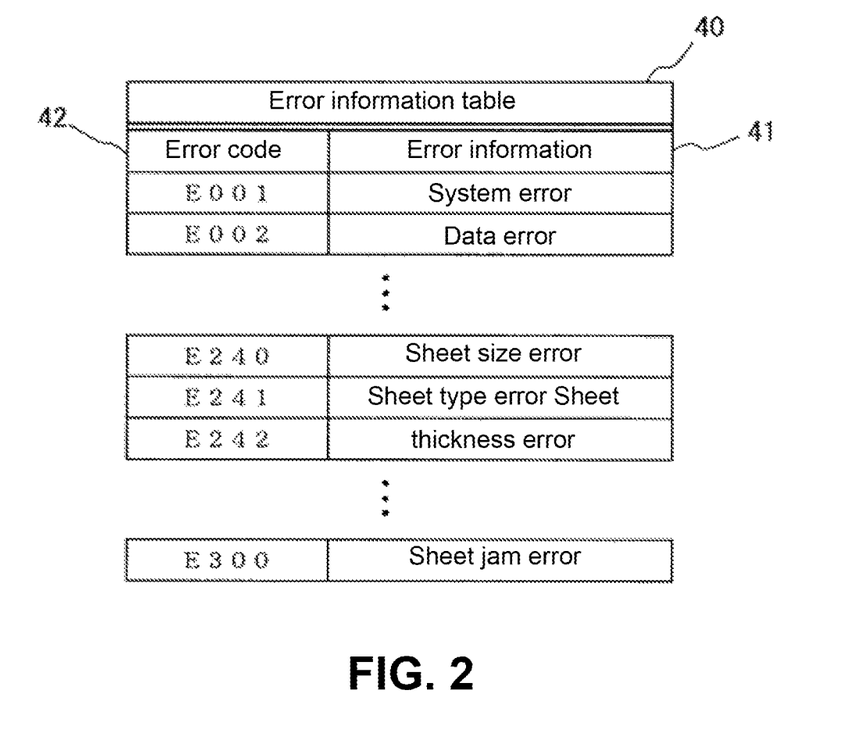
FIG. 2 is a schematic view showing a configuration example of an error information table stored in an error information storage unit of a storage unit according to the first embodiment of the present invention.

FIG. 2 is a schematic view showing a configuration example of an error information table 40 stored in the error information storage unit 121 of the storage unit 12 according to the first embodiment of the present invention.

As shown in FIG. 2, the error information table 40 stores error information 41 according to a type of error and an error code 42. The error information 41 is paired with the error code 42. More specifically, the error code 42 "E001" is paired with the error information 41 "System error"; the error code 42 "E002" is paired with the error information 41 "Data error"; the error code 42 "E240" is paired with the error information 41 "Sheet size error"; the error code 42 "E241" is paired with the error information 41 "Sheet type error"; the error code 42 "E242" is paired with the error information 41 "Sheet thickness error"; and the error code 42 "E300" is paired with the error information 41 "Sheet jam error".

Figure 3:
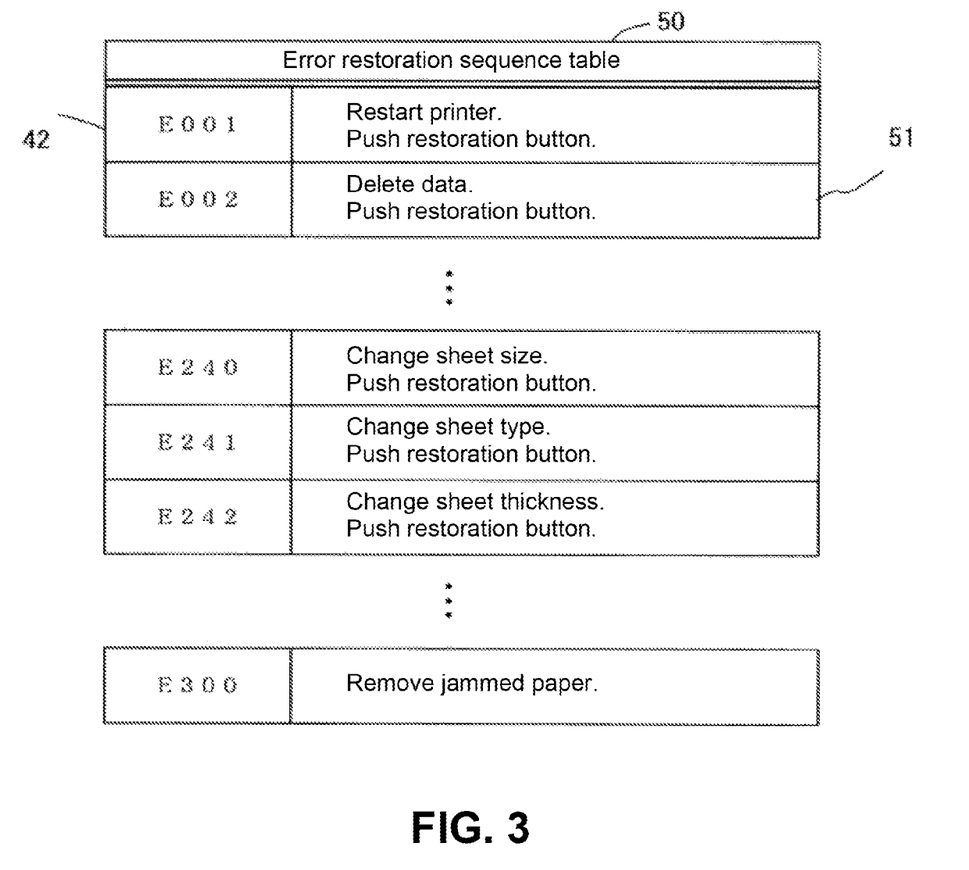
FIG. 3 is a schematic view showing a configuration example of an error restoration sequence table stored in an error restoration sequence storage unit of the storage unit according to the first embodiment of the present invention.

FIG. 3 is a schematic view showing a configuration example of an error restoration sequence table 50 stored in the error restoration sequence storage unit 122 of the storage unit 12 according to the first embodiment of the present invention.

As shown in FIG. 3, the error restoration sequence table 50 stores an error restoration sequence 51 and the error code 42, and the error restoration sequence 51 is paired with the error code 42. More specifically, the error code 42 "E0011" "E002" "E240" "E241" "E242" are paired with the error restoration sequence 51 representing an error restoration sequence of each error. The error restoration sequence 51 may be represented with text information or information using sound or video.

Figure 4:
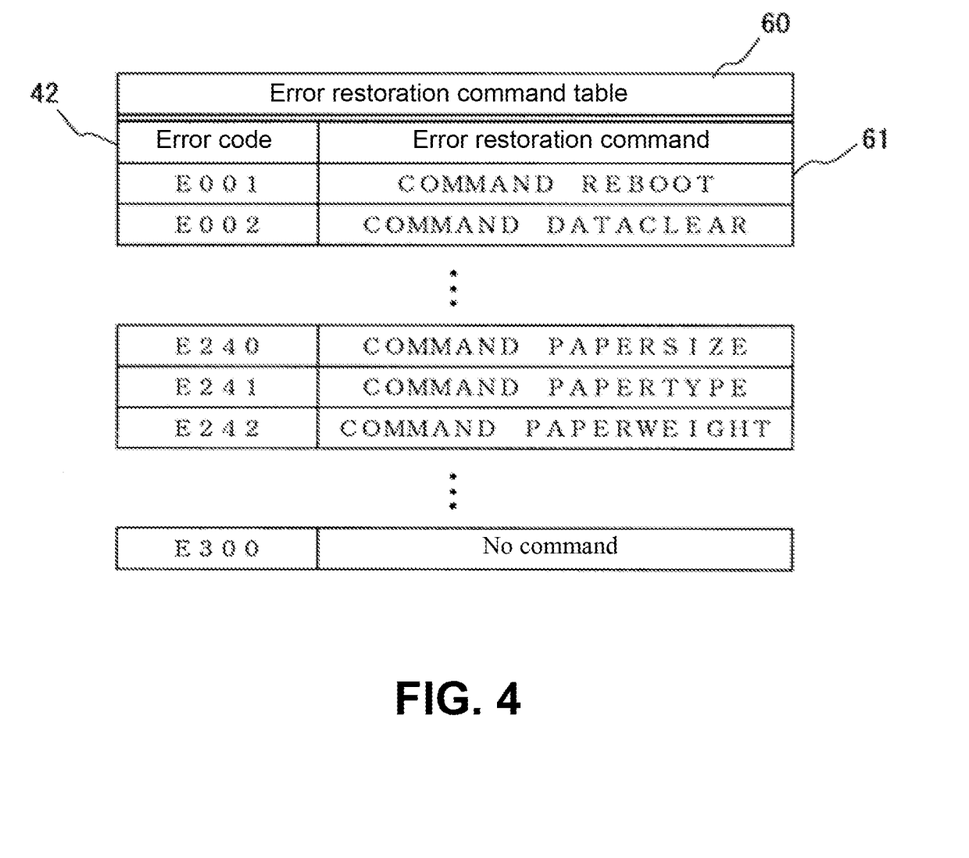
FIG. 4 is a schematic view showing a configuration example of an error restoration command table stored in an error restoration command storage unit of the storage unit according to the first embodiment of the present invention.

FIG. 4 is a schematic view showing a configuration example of an error restoration command table 60 stored in the error recovery command storage unit 123 of the storage unit 12 according to the first embodiment of the present invention.

As shown in FIG. 4, the error restoration command table 60 stores an error restoration command 61 and the error code 42, and the error restoration command 61 is paired with the error code 42. More specifically, the error code 42 "E001" is paired with the error restoration command 61 "Command reboot" for rebooting to restore "E001"; the error code 42 "E002" is paired with the error restoration command 61 "Command data clear" for deleting data to restore "E002"; the error code 42 "E240" is paired with the error restoration command 61 "Command papersize" for changing a sheet size to restore "E240"; the error code 42 "E241" is paired with the error restoration command 61 "Command papertype" for changing a sheet type to restore "E241"; and the error code 42 "E242" is paired with the error restoration command 61 "Command paperweight" for changing a sheet thickness to restore "E242".

In the embodiment, as described above, the corresponding command is stored relative to the simple error which the printer 10 can automatically restore. The error code 41 "E300" is the non-restorable error which the printer 10 cannot automatically restore, and it is necessary for the operator to perform the error restoration operation. Accordingly, there is no command corresponding to the error information 41 "E300". Similarly, there is no command corresponding to other non-restorable errors which the printer 10 cannot automatically restore.

In the embodiment, the error restoration command 61 stored in the error restoration command storage unit 123 may be represented with a command format capable of controlling the printer 10 such as a PJL (Printer Job Language) command, a PS (Post Script) command, and a PCL (Printer Control Language).

Figure 5:
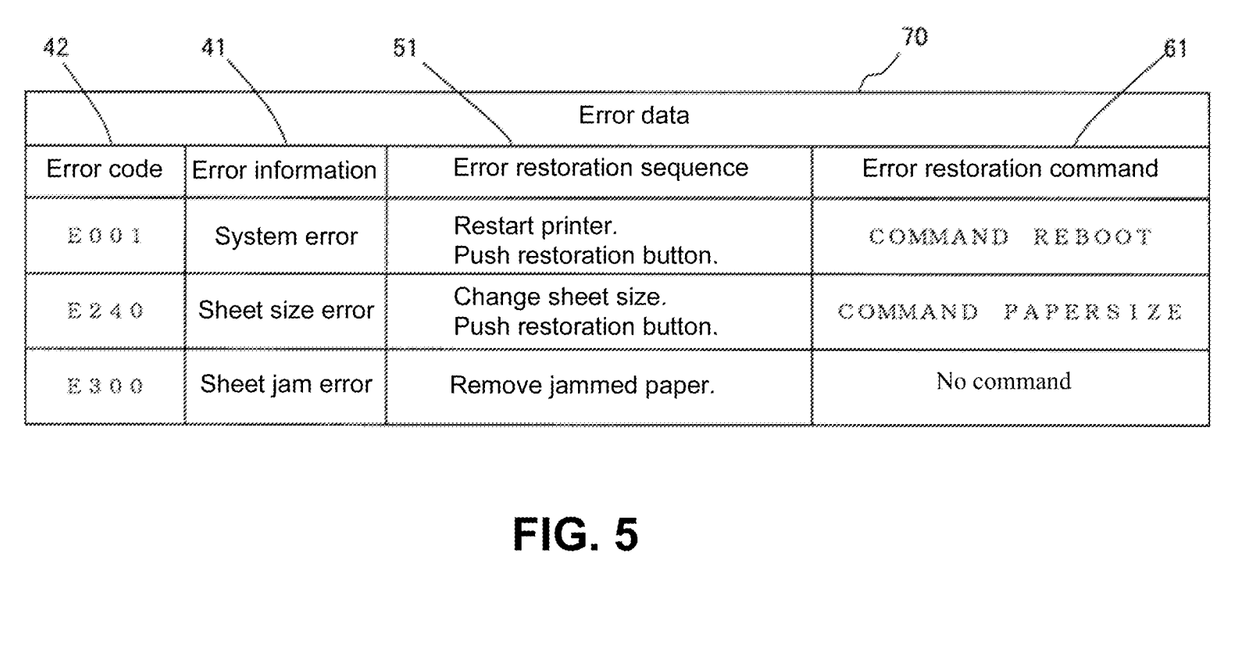
FIG. 5 is a schematic view showing a configuration example of error data created in an error analyzing unit when an error occurs in a printer according to the first embodiment of the present invention.

FIG. 5 is a schematic view showing a configuration example of error data 70 created in the error analyzing unit 162 when an error occurs in the printer 10 according to the first embodiment of the present invention.

As shown in FIG. 5, the error data 70 includes the error information 41, the error code 42, the error restoration sequence 51, and the error restoration command 61. The example represents the error data 70 when the error code 42 is "E001", "E240" and "E300".

Figure 6A:
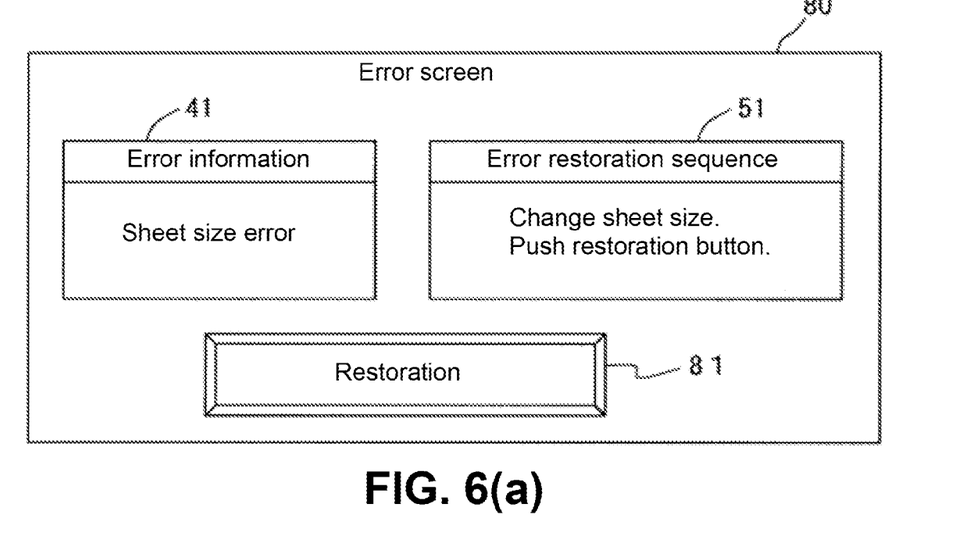
FIG. 6(a) is a display example of an error screen of the display unit when an error occurs in the printer.
Figure 6B:
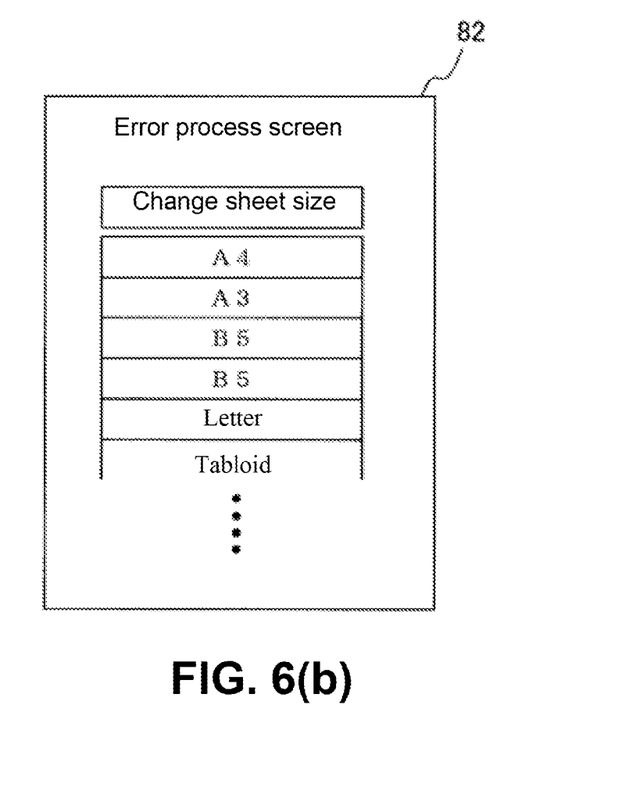
FIG. 6(b) is a display example of an error process screen of the display unit when an error restoration command is executed.

FIGS. 6(*a*) and 6(*b*) are schematic views showing display examples of the display unit 152 according to the first embodiment of the present invention. More specifically, FIG. 6(*a*) is a display example of an error screen 80 of the display unit 152 (refer to FIG. 1) when an error occurs in the printer 10, and FIG. 6(b) is a display example of an error process screen 82 of the display unit 152 when an error restoration command is executed.

As shown in FIG. 6(a), on the error screen 80, the error information 41 and the error restoration sequence 51 obtained from the error data 70 are displayed. Further, a restoration button 81 of a touch panel type is displayed on the error screen 80 for instructing restoration of the error.

As shown in FIG. 6(b), the error process screen 82 is displayed when the restoration button 81 is pushed to execute the error restoration command 61. In the example, the error screen 80 and the error process screen 82 are displayed in the case that the error information 41 is the sheet size error.

In the embodiment, the restoration button 81 is the touch panel type, so that it is recognized to push the restoration button 81 when an operator touches the screen displayed on the display unit 152 (refer to FIG. 1).

Alternatively, the restoration button 81 may be a mechanical type disposed in the printer 10. Further, as far as the operator can confirm the error, the display unit 152 may be a configuration in which the error is displayed through flashing of an LED (light Emitting Diode), and a type of error is identified through a flashing speed.

An operation of the electric system with the configuration described above will be explained next.

When the printer 10 (refer to FIG. 1) receives the image data with the transmission reception unit 14 from the PC 20, the data analyzing unit 161 analyzes the image data, so that the printing unit 18 prints the image data. Through the process, when the error detection unit 17 detects an error, the error detection unit 17 creates the error code 42 corresponding to the error. Afterward, the error analyzing unit 162 retrieves the error code 42, the error information 41, the error restoration sequence 51, and the error restoration command 61 associated with the error thus detected, so that the error analyzing unit 162 creates the error data 70 (refer to FIG. 5). Accordingly, the error screen 80 (refer to FIG. 6(a)) is displayed on the display unit 152.

In the next step, the operator confirms the error information 41 and the error restoration sequence 51 displayed on the error screen 80, and operates the restoration button 81 to instruct the restoration of the error. When the restoration button 81 is pushed, the error analyzing unit 162 in the printer 10 analyzes and executes the error restoration command 61. More specifically, the error analyzing unit 162 analyzes the error restoration command 61, and sends an analysis result to the control unit 11. When the control unit 11 receives the analysis result, the control unit 11 performs an error restoration sequence as the error restoration process according to a type of error thus analyzed. For example, when the error restoration command 61 is "Command reboot", the control unit 11 performs a rebooting sequence as the error restoration sequence.

Figure 7:
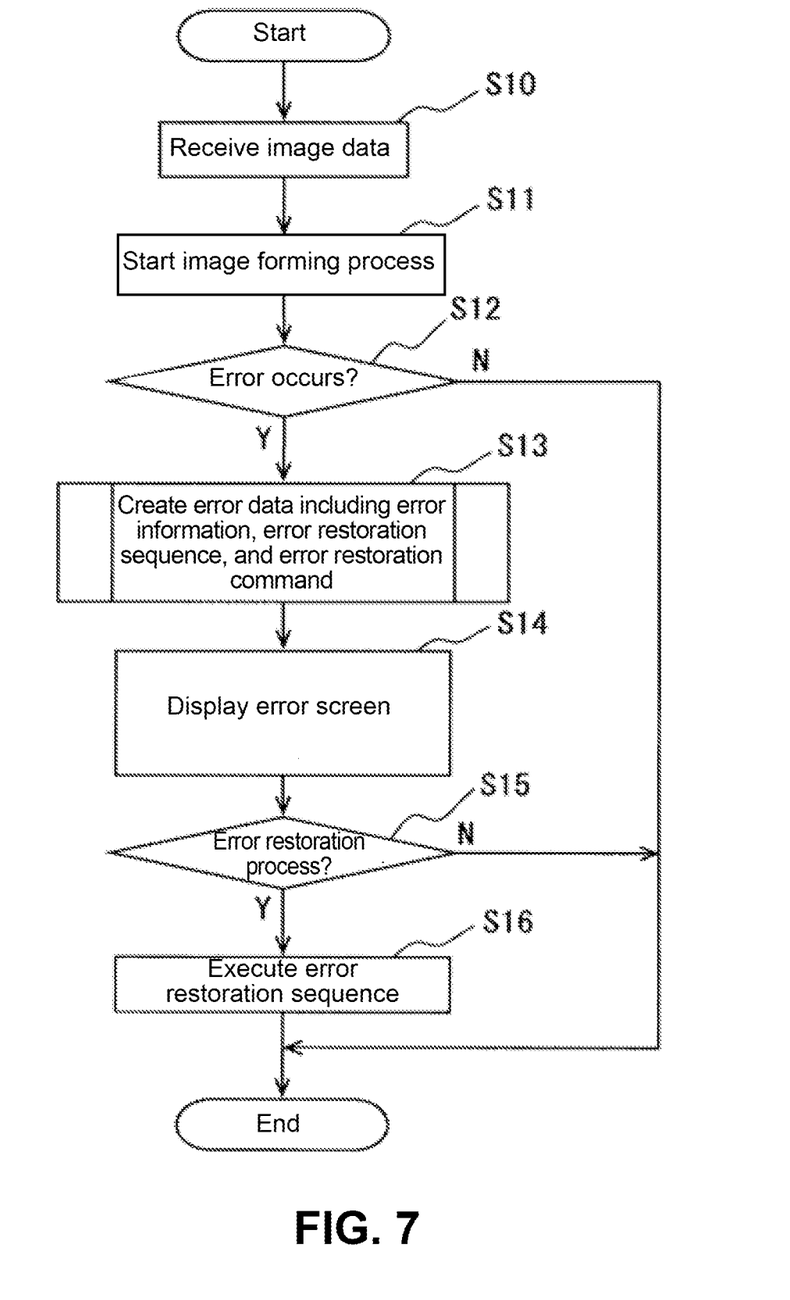
FIG. 7 is a flow chart showing an error restoration process performed with the printer when an error occurs during a printing operation according to the first embodiment of the present invention.

An operation of the printer 10 in an error restoration process will be explained with reference to FIGS. 1 to 7. FIG. 7 is a flow chart showing the error restoration process performed with the printer 10 when an error occurs during a printing operation according to the first embodiment of the present invention.

In step S10, the printer 10 (refer to FIG. 1) receives the image data with the transmission reception unit 14 from the PC 20. In step S11, the image forming process starts, in which the data analyzing unit 161 analyzes the image data, and the printing unit 18 stars printing the image data thus analyzed. In step S12, the error detection unit 17 determines whether an error occurs during the image forming process. When the error detection unit 17 determines that an error occurs during the image forming process (Yes in step S12), the error detection unit 17 creates the error code 42 corresponding to the error.

In step S13, the error analyzing unit 162 creates the error data 70 (refer to FIG. 5) including the error information 41, the error restoration sequence 51, and the error restoration command 61 according to the error code 42. When the error detection unit 17 determines that an error does not occur during the image forming process (No in step S12), the error restoration process is not performed, thereby completing the process.

In step S14, the display unit 152 displays the error screen 80 (refer to FIG. 6) including the error information 41 and the error restoration sequence 51 of the error data 70 together with the restoration button 81. Referring to the error screen 80, the operator determines whether the error is restored. When the operator determines that the error is restored, the operator pushes the restoration button 81 through a touch operation to instruct the error restoration process. In step S15, when the operator pushes the restoration button 81, the control unit 11 determines that the operator instructs the error restoration process. Accordingly, the control unit 11 of the printer 10 determines that the operator performs the error restoration process (Yes in step S15). In step S16, the data analyzing unit 161 analyzes the error restoration command 61, so that the control unit 11 executes the error restoration sequence according to the analysis result.

For example, when the error thus occurred is the sheet size error represented with the error code 42 "E240" (refer to FIG. 5) displayed on the error screen 80 shown in FIG. 6, and the operator confirms the error screen 80 shown in FIG. 6 and performs the error restoration process through operating the restoration button 81, the error restoration command 61 is executed to display the error process screen 82 shown in FIG. 6(b).

In this case, the operator confirms the error process screen 82 and appropriately sets a proper sheet size, thereby restoring the sheet size error. Note that when the error is detected in step S12, the printer 10 stops the image forming process. When the error is restored in step S16, the printer 10 resumes the image forming process.

When the operator does not instruct the error restoration process, the printer 10 determines that the operator does not perform the error restoration process (No in step S15). Accordingly, the printer 10 does not perform the error restoration process, thereby completing the process. Note that after the error screen 80 is displayed, when the operator does not perform the error restoration process for a specific period of time, the printer 10 determines that the operator does not perform the error restoration process.

Figure 8:
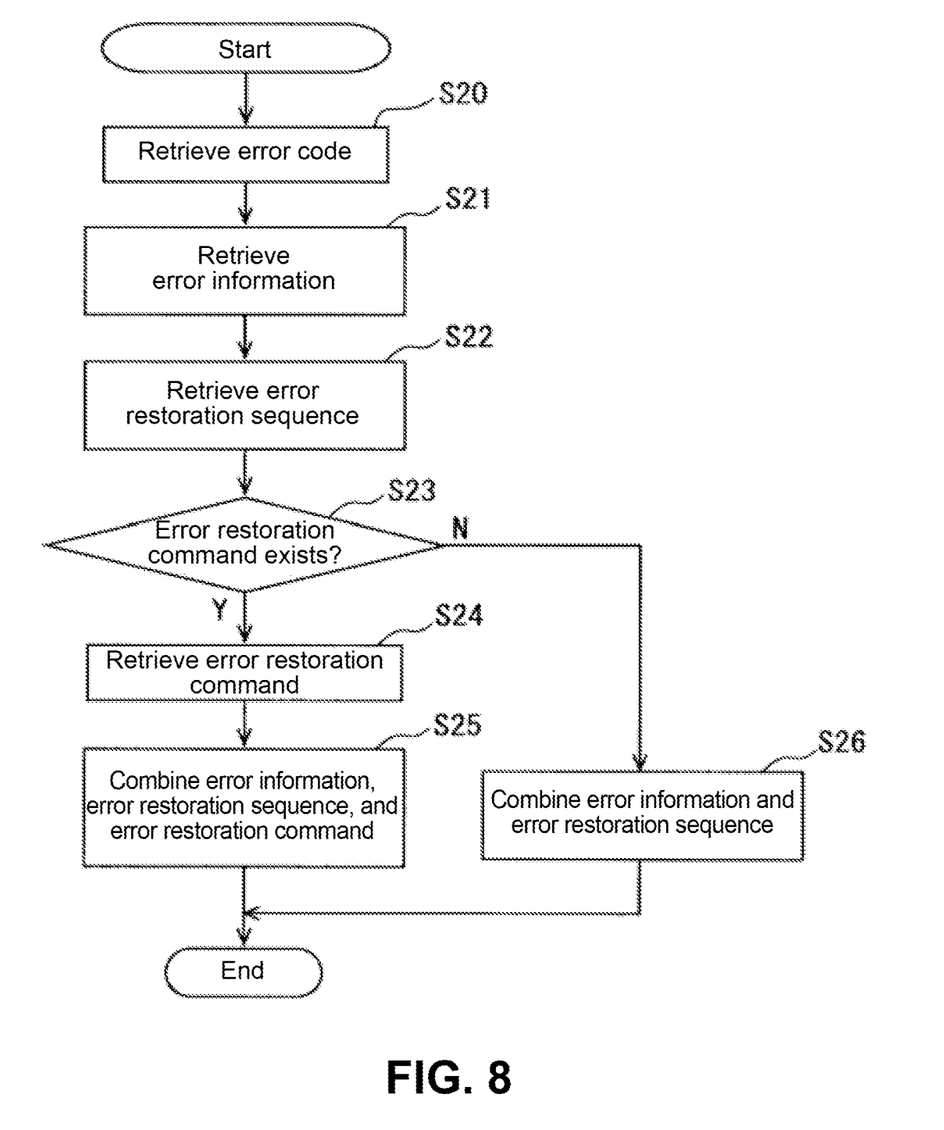
FIG. 8 is a flow chart showing a creation process for forming error data in step S13 in the flow chart shown in FIG. 7 according to the first embodiment of the present invention.

A creation process for forming the error data 70 will be explained next with reference to FIG. 8. FIG. 8 is a flow chart showing the creation process for forming the error data 70 in step S13 in the flow chart shown in FIG. 7 according to the first embodiment of the present invention.

In step S20, when the error detection unit 17 of the printer 10 detects the error, the error analyzing unit 162 retrieves the error code 42 (refer to FIG. 5) created with the error detection unit 17 according to the error contents. In step S21, the error analyzing unit 162 retrieves the error information 41 corresponding to the error code 42 from the error information table 40 (refer to FIG. 2). In step S22, the error analyzing unit 162 retrieves the error restoration sequence 51 corresponding to the error code 42 from the error restoration sequence table 50 (refer to FIG. 3). In step S23, the error analyzing unit 162 determines whether the error restoration command 61 corresponding to the error code 42 exists in the error restoration command table 60 (refer to FIG. 4).

In step S24, when the error analyzing unit 162 determines that the error restoration command 61 corresponding to the error code 42 exists in the error restoration command table 60 (Yes in step S23), the error analyzing unit 162 retrieves the error restoration command 61 corresponding to the error code 42 from the error restoration command table 60. In step S25, the error analyzing unit 162 combines the error information 41, the error restoration sequence 51, and the error restoration command 61 to create the error data 70 (refer to FIG. 5).

In step S26, when the error analyzing unit 162 determines that the error restoration command 61 corresponding to the error code 42 does not exist in the error restoration command table 60 (No in step S23), the error analyzing unit 162 retrieves the error restoration command 61 corresponding to the error code 42 from the error restoration command table 60.

In step S25, the error analyzing unit 162 combines only the error information 41 and the error restoration sequence 51 to create the error data 70 not including the error restoration command 61.

In the embodiment, the printer 10 or the image forming apparatus is explained as the electric device. The present invention may be applicable to an electric device other than the printer 10 such as a scanner and a modem, as far as the electric device is provided with an operation unit for operating the electric device, a display unit for recognizing an error, and a storage unit for storing an error restoration command.

In the embodiment, it is preferred that the storage unit 12 includes an error restoration log storage unit for storing information regarding a restored error. When the control unit 11 stores an execution history of the error restoration command 61 in the error restoration log storage unit, it is possible for the operator to confirm the error thus restored later.

As described above, in the embodiment, when a simple error except a physical error such as a paper jam occurs, it is possible to automatically perform the error restoration command. Accordingly, it is possible to reduce a burden on the operator and time for restoring the error, thereby simplifying the error restoration process.

Second Embodiment

Figure 9:
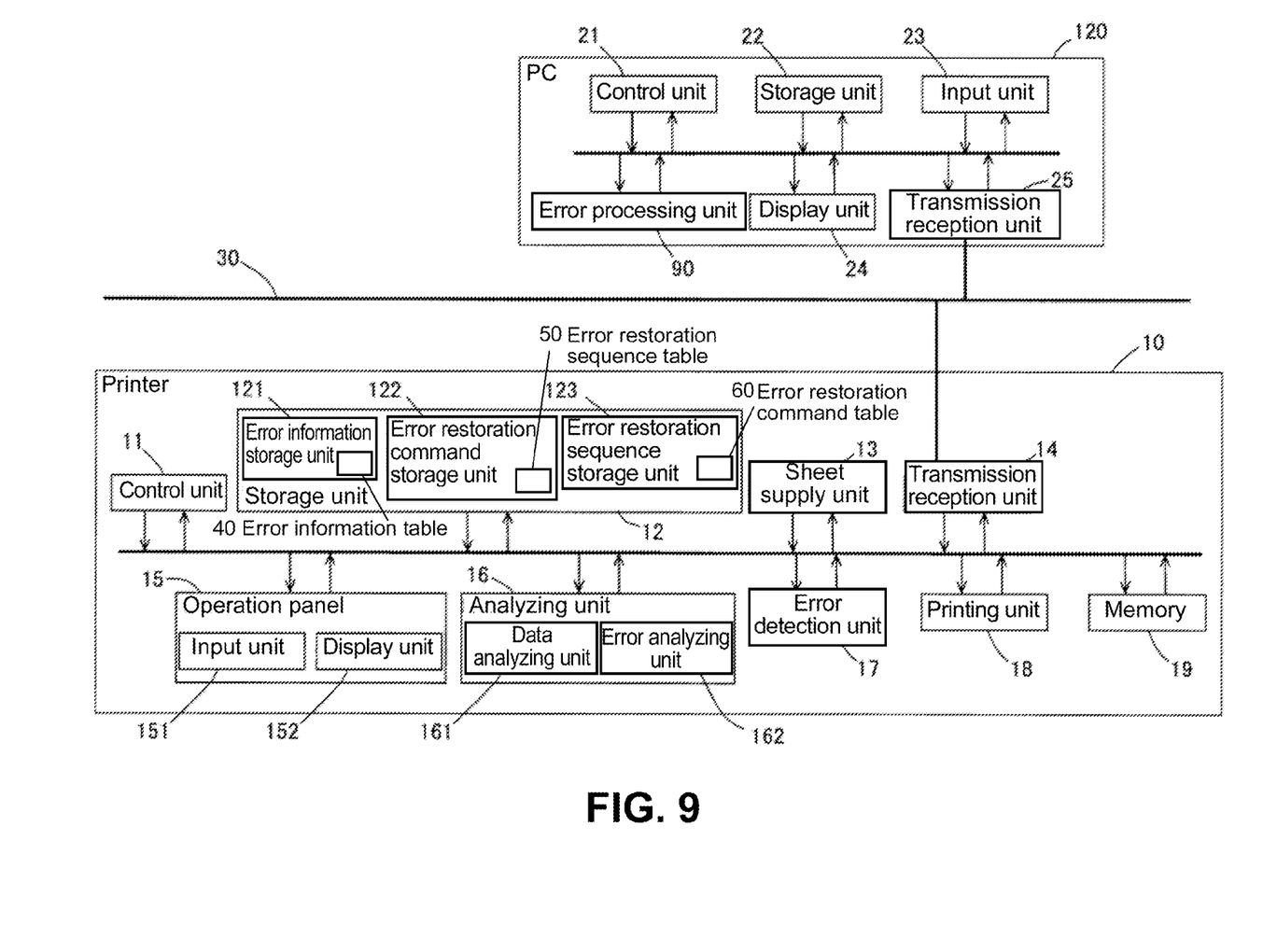
FIG. 9 is a schematic view showing a block diagram showing a configuration of an electric system according to a second embodiment of the present invention.

A second embodiment of the present invention will be explained next. FIG. 9 is a schematic view showing a block diagram showing a configuration of an electric system according to the second embodiment of the present invention.

In the second embodiment, different from the electric system in the first embodiment shown in FIG. 1, the electric system includes a PC 120 having an error processing unit 90. Further, the PC 120 communicates with the printer 10 using communication contents different from that in the first embodiment. Components of the electric system in the second embodiment shown in FIG. 9 similar to the electric system in the first embodiment shown in FIG. 1 are designated with the same reference numerals, and explanations thereof are omitted.

In the electric system in the first embodiment shown in FIG. 1, when the error occurs in the printer 10, the error screen 80 (refer to FIG. 6) is displayed on the display unit 152 of the printer 10. After the operator confirms the contents of the error screen 80, the operator instructs the printer 10 to execute the error restoration command 61 for restoring the error.

On the other hand, in the electric system in the second embodiment shown in FIG. 9, when the error occurs in the printer 10, the error screen 80 (refer to FIG. 6) is displayed on the display unit 24 of the PC 120. After the operator confirms the contents of the error screen 80, the operator operates the PC 120, so that the PC 120 executes an error restoration command for restoring the error according to an instruction of the operator.

More specifically, when the error analyzing unit 162 creates the error data 70, similar to the first embodiment, the control unit 11 of the printer 10 transmits the error data 70 to the PC 120 through the transmission reception unit 14. When the transmission reception unit 14 receives the error restoration command transmitted from the PC 120 (described later), similar to the first embodiment, the data analyzing unit 161 analyzes the error restoration command, so that the error restoration command is executed.

As described above, the PC 120 includes the error processing unit 90, and the control unit 21 controls an operation of the error processing unit 90. When the transmission reception unit 25 receives the error data 70 transmitted from the printer 10, the error processing unit 90 processes the error data 70. Accordingly, the error screen 80 including the information obtained from the error data 70 is displayed on the display unit 24 such as a monitor display. After the operator confirms the contents of the error screen 80, the operator operates the input unit 23 of the PC 120 such as a keyboard. According to the instruction of the operator, the transmission reception unit 25 transmits the error restoration command 61 included in the error data 70 to the printer 10 for restoring the error.

In the embodiment, the error screen 80 may be displayed through a printer driver as a device driver for transmitting data created with an application to the printer 10. Alternatively, the error screen 80 may be displayed using a specific application to be started when the error data 70 includes data received from the printer 10.

Figure 10:
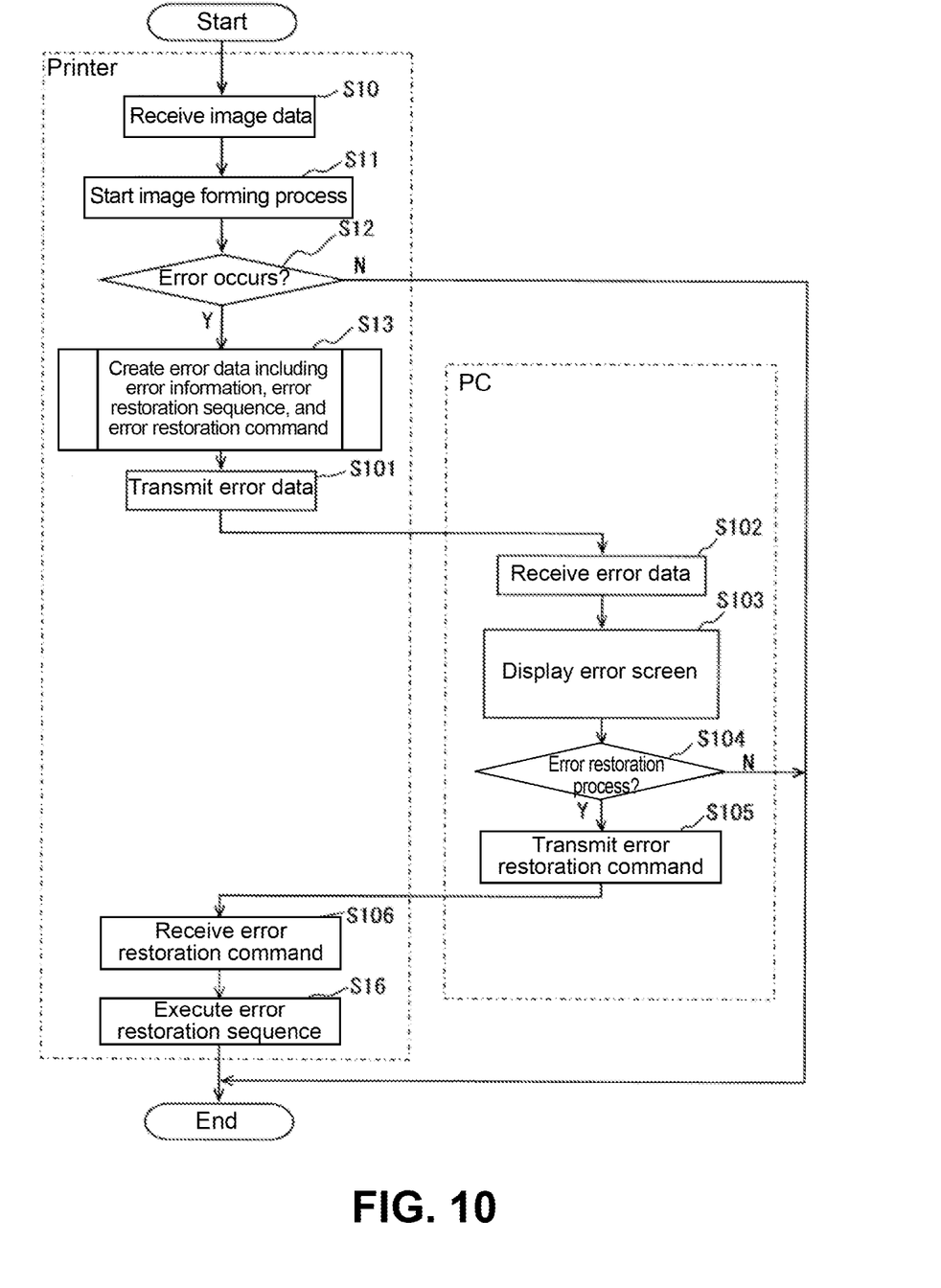
FIG. 10 is a flow chart showing an error restoration process performed with a printer and a PC when an error occurs during a printing operation according to the second embodiment of the present invention.

An operation of the electric system will be explained next with reference to FIGS. 2 to 6, 8, 9, and 10. FIG. 10 is a flow chart showing the error restoration process performed with the printer 10 and the PC 120 when the error occurs during a printing operation according to the second embodiment of the present invention. Note that the process from step S10 to step S13 and step S16 are similar to the process shown in FIG. 7, and an explanation thereof is omitted.

In step S13, the error analyzing unit 162 creates the error data 70 (refer to FIG. 5) including the error information 41, the error restoration sequence 51, and the error restoration command 61 according to the error code 42. In step S101, the control unit 11 of the printer 10 transmits the error data 70 to the PC 120, from which the image data are transmitted, through the transmission reception unit 14. In step S102, the PC 120 receives the error data 70. In step S103, the error processing unit 90 processes the error data 70 thus received, and displays the information (the error information 41 and the error restoration sequence 51) obtained from the error data 70 and the error screen 80 including the restoration button 81 (refer to FIG. 6) on the display unit 24 such as a monitor.

In the embodiment, the control unit 11 of the printer 10 may transmit the error data 70 having a generic data format such as a text format and a PDF (Portable Document Format) format in step 5101. Further, the control unit 11 of the printer 10 transmits the error data 70 to the PC 120, from which the image data are transmitted, and may transmit the error data 70 to a device selected according to information stored in the printer 10 in advance, or a device selected according to information stored in data received with the printer 10.

In step S104, referring to the error screen 80 displayed on the display unit 24 of the PC 120, the operator determines whether the error is restored. When the operator determines that the error is restored, the operator operates the input unit 23 such as a mouse and clicks the restoration button 81 to instruct the error restoration process. Accordingly, the error processing unit 90 determines that the operator performs the error restoration process (Yes in step S104). In step S105, the error processing unit 90 transmits the error restoration command 61 included in the error data 70 thus received to the printer 10 through the transmission reception unit 25.

In step S106, when the transmission reception unit 14 receives the error restoration command 61 transmitted from the PC 120, the control unit 11 of the printer 10 controls the data analyzing unit 161 to analyze the error restoration command 61 to execute the error restoration command 61.

For example, when the error thus occurred is the sheet size error represented with the error code 42 "E240" (refer to FIG. 5) displayed on the error screen 80 shown in FIG. 6, and the operator confirms the error screen 80 shown in FIG. 6 and performs the error restoration process through operating the restoration button 81, the error restoration command 61 is executed to display the error process screen 82 shown in FIG. 6(*b*) on the display unit 24 of the PC 120.

In this case, the operator confirms the error process screen 82 and appropriately sets a proper sheet size, thereby restoring the sheet size error. When the operator sets the proper sheet size, the error processing unit 90 recognizes the sheet size thus selected, and the sheet size is transmitted to the data analyzing unit 161 through the transmission reception unit 25 of the PC 120 and the transmission reception unit 14 of the printer 10.

When the operator does not instruct the error restoration process, the error processing unit 90 determines that the operator does not perform the error restoration process (No in step S104). Accordingly, the printer 10 does not perform the error restoration process, thereby completing the process. Note that after the error screen 80 is displayed, when the operator does not perform the error restoration process for a specific period of time, and the error restoration command 61 is not transmitted from the PC 120, the printer 10 determines that the operator does not perform the error restoration process.

In the embodiment, the printer 10 or the image forming apparatus is explained as the electric device. The present invention may be applicable to an electric device other than the printer 10 such as a scanner and a modem, as far as the electric system is capable of operating an electric device from a PC as a host device.

In the embodiment, it is preferred that the storage unit 12 includes an error restoration log storage unit for storing information regarding a restored error. When the control unit 11 stores an execution history of the error restoration command 61 in the error restoration log storage unit, similar to the first embodiment, it is possible for the operator to confirm the error thus restored later.

Further, it may be configured such that it is possible to identify an operator who transmits the error restoration command 61, thereby making it possible to easily collect information regarding causes of errors.

As described above, in the electric system in the embodiment, when a simple error except a physical error such as a paper jam occurs, it is possible to automatically perform the error restoration command in the PC 120 connected to the network. Accordingly, it is possible to reduce a burden on the operator and time for restoring the error, thereby simplifying the error restoration process.

In the embodiments described above, the printer 10 or the image forming apparatus is explained as the electric device constituting the electric system. The present invention is not limited to the printer 10, and may be applicable to a multi functional product, facsimile, and a copier having a reading unit such as a scanner. Further, the present invention may be applicable to an electric device capable of being operated from a host device such as a PC.

The disclosure of Japanese Patent Application No. 2009-156672, filed on Jul. 1, 2009, is incorporated in the application by reference.

While the invention has been explained with reference to the specific embodiments of the invention, the explanation is illustrative and the invention is limited only by the appended claims.

What is claimed is:

1. An electric device capable of transmitting and receiving data relative to an external device, comprising:
    an error detection unit configured to detect an error occurred in the electric device;
    an error restoration command holding unit configured to hold an error restoration command to restore the error, said error restoration command having a command format capable of controlling the electric device;
    an error analyzing unit configured to analyze the error occurred in the electric device and retrieve the error restoration command from the error restoration command holding unit according to an analysis result of the error; and
    an error restoration command execution unit configured to execute the error restoration command retrieved with the error analyzing unit to restore the error.

2. The electric device according to claim 1, further comprising an error restoration sequence holding unit configured to hold an error restoration sequence of the error said error analyzing unit being arranged to retrieve the error restoration sequence from the error restoration sequence holding unit according to the analysis result of the error when the error detection unit detects the error.

3. The electric device according to claim 1, further comprising a display unit configured to display a restoration instruction button to instruct error restoration through executing the error restoration command.

4. The electric device according to claim 1, wherein said error analyzing unit is arranged to create error data including the error restoration command obtained from the error restoration command holding unit according to the analysis result of the error when the error detection unit detects the error.

5. The electric device according to claim 4, further comprising a transmission reception unit configured to transmit the error data to the external device.

6. The electric device according to claim 4, wherein said error analyzing unit is arranged to create the error data with a data format including a text format or a PDF format to the external device.

7. The electric device according to claim 1, further comprising a printing unit configured to print an image on a sheet.

8. The electric device according to claim 1, wherein said error detection unit is configured to detect the error including a simple error that the electric device can restore automatically.

9. The electric device according to claim 1, wherein said error detection unit is configured to detect the error including a system error, a data error, a sheet size error, a sheet type error, and a sheet thickness error.

10. The electric device according to claim 1, wherein said error restoration command holding unit is configured to hold the error restoration command having the command format including PJL (Printer Job Language), PS (Post Script), or PCL (Printer Control Language).

11. An electric system comprising a host device and an electric device capable of transmitting and receiving data relative to the host device, wherein said electric device includes:
  an error detection unit configured to detect an error occurred in the electric device;
  an error restoration command holding unit configured to hold an error restoration command to restore the error, said error restoration command having a command format capable of controlling the electric device;
  an error analyzing unit configured to analyze the error occurred in the electric device and retrieve the error restoration command from the error restoration command holding unit according to an analysis result of the error; and
  an error restoration command execution unit configured to execute the error restoration command retrieved with the error analyzing unit to restore the error.

12. The electric system according to claim 11, wherein said electric device further includes an error restoration sequence holding unit configured to hold an error restoration sequence of the error, said error analyzing unit being arranged to retrieve the error restoration sequence from the error restoration sequence holding unit according to the analysis result of the error when the error detection unit detects the error.

13. The electric system according to claim 11, wherein said electric device further includes a display unit configured to display a restoration instruction button to instruct error restoration through executing the error restoration command.

14. The electric device according to claim 11, wherein said error analyzing unit is arranged to create error data including the error restoration command obtained from the error restoration command holding unit according to the analysis result of the error when the error detection unit detects the error.

15. The electric device according to claim 14, wherein said host device further includes a display unit, and an error processing unit configured to display information on the display unit according to the error data obtained from the electric device.

16. The electric device according to claim 15, wherein said electric device further includes a transmission reception unit configured to transmit the error data to the host device, said host device displaying a restoration instruction button on the display unit to instruct error restoration through executing the error restoration command when the host device receives the error data.

17. The electric system according to claim 14, wherein said error analyzing unit is arranged to create the error data with a data format including a text format or a PDF format to the host device.

18. The electric system according to claim 11, wherein said electric device further includes a printing unit configured to print an image on a sheet.

19. The electric system according to claim 11, wherein said error detection unit is configured to detect the error including a simple error that the electric device can restore automatically.

20. The electric system according to claim 11, wherein said error detection unit is configured to detect the error including a system error, a data error, a sheet size error, a sheet type error, and a sheet thickness error.

* * * * *